United States Patent [19]

Krishnakumar et al.

[11] 4,342,895
[45] Aug. 3, 1982

[54] METHOD OF PROCESSING POLYETHYLENE TEREPHTHALATE PREFORMS AND APPARATUS

[75] Inventors: Suppayan M. Krishnakumar, Nashua, N.H.; John F. E. Pocock, Neu-Isenburg, Fed. Rep. of Germany; Gautam K. Mahajan, Nashua, N.H.; John F. Trembly, Loudonville, N.Y.

[73] Assignee: The Continental Group, Inc., New York, N.Y.

[21] Appl. No.: 97,774

[22] Filed: Nov. 27, 1979

[51] Int. Cl.³ .......................... H05B 6/54; B29H 5/26
[52] U.S. Cl. .............................. 219/10.43; 219/10.41; 219/10.57; 219/10.81; 264/26; 264/535; 264/DIG. 46; 425/174.8 E
[58] Field of Search ............... 219/10.41, 10.81, 10.43, 219/10.57, 10.55 M, 10.55 R, 10.55 A, 10.69, 10.71; 264/25, 26, 27, 535, DIG. 46; 425/526, 174.8 R, 174.8 E, 174.4

[56] References Cited
U.S. PATENT DOCUMENTS 2,370,624  3/1945  Gillespie .......................... 219/10.41
2,415,025  1/1947  Grell et al. .................... 219/10.81 X
2,472,370  6/1949  Drugmand ..................... 219/10.81 X
2,642,627  6/1953  Mann et al. ............................ 264/26
3,374,334  3/1968  Hopkins ........................... 219/10.69
3,409,537  11/1968 Cannon ............................. 264/27 X
3,469,012  9/1969  Devaney ................................ 264/27
3,786,221  1/1974  Silverman ......................... 264/27 X
3,830,893  8/1974  Steingiser ............................. 264/25
4,147,487  4/1979  Dickson et al. ................... 425/174.4

Primary Examiner—B. A. Reynolds
Assistant Examiner—Philip H. Leung
Attorney, Agent, or Firm—Charles E. Brown

[57] ABSTRACT

This relates to the heating of polyethylene terephthalate by way of RF energy. It has been found that if polyethylene terephthalate articles are passed through a radio frequency energy field, the molecules thereof will become excited and rapid heating will result. This heating is particularly useful in the heating of preforms prior to the blow molding thereof and by varying the configuration and relationship of electrodes, controlled heating of the preforms may be effected with it being possible to have a controlled temperature differential along the length of the preform or other article so heated.

12 Claims, 3 Drawing Figures

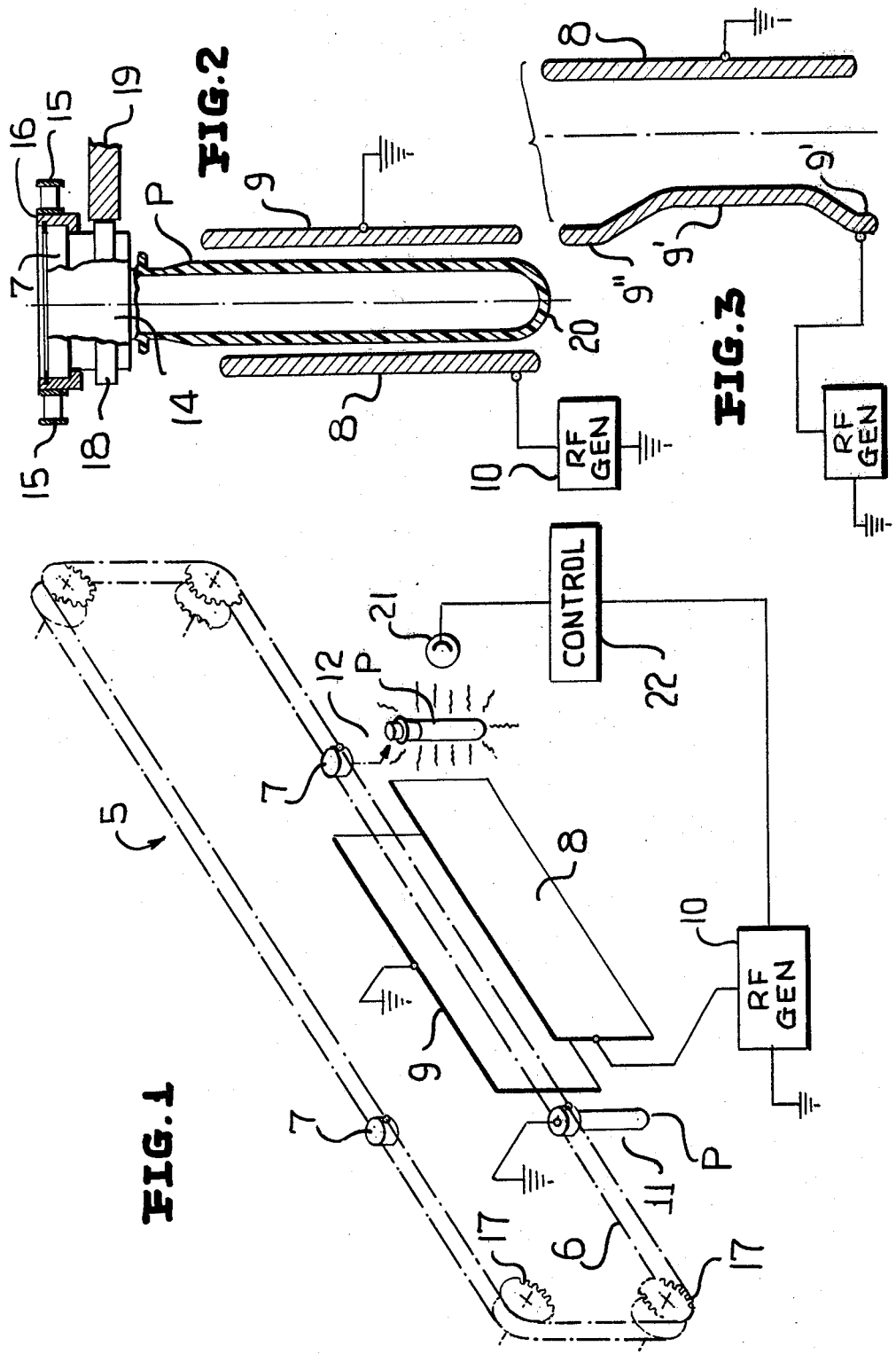

METHOD OF PROCESSING POLYETHYLENE TEREPHTHALATE PREFORMS AND APPARATUS

This invention relates to the reheating of polyethylene terephthalate (PET) preforms prior to the forming thereof into bottles and the like, and most particularly to the use of radio frequency electrical energy for such heating.

The U.S. Pat. to Steingiser, No. 3,830,893, granted Aug. 20, 1974, discloses that electrical energy of microwave frequency may be utilized in the heating of high nitrile preforms. However, the molecular construction of PET is materially different from that of nitriles and as a result it had been thought that PET could not be efficiently heated by subjecting it to radio frequency wave energy. As is specifically set forth in the Steingiser patent, it is the polar nitrile molecules which are excited to effect the generation of frictional heat relatively evenly throughout the wall of a thermoplastic body. It was not thought that PET contained the equivalent of the polar nitrile molecule which could be excited into oscillating motion sufficient to generate the required frictional heat. As evidence thereof, attention is directed to the U.S. Pat. to Dickson et al, No. 4,147,487, granted Apr. 3, 1979, which specifically relates to the heating of PET preforms by utilizing a complex infrared heating system.

It has been unexpectedly found that by subjecting a preform for a bottle which is formed of PET to radio frequency waves there is molecular excitation within the material of the preform and the required heating of the preform sufficient for blow molding can be effected efficiently within a period of 5-25 seconds.

It has been further found in accordance with this invention that by varying the electrode configuration the radio frequency energy field may be varied so as to obtain in a PET preform for a bottle a temperature gradient up to 100° F. per inch along the length of the preform. Accordingly, temperature profiling and selective heating along the length of the preform is possible.

It has also been found in accordance with this invention that by making the electrodes of different lengths so that the lower portions of the electrodes are offset from one another a controlled heating of the closed end portion at the bottom of the preform can be effected.

In accordance with this invention, it is also proposed to support the preform while being subjected to the radio frequency energy field utilizing a metallic support and that beneficial heating can be obtained by grounding that support.

Further, in accordance with this invention, by providing a radio frequency generator having a controllable power output, the temperature of the preform can be controlled within ±1° F. by incorporating a closed loop automatic temperature controller and/or microprocessor.

It has also been found that in accordance with this invention the ambient temperature and fluctuations therein are not a concern and that the automatic temperature control system will still control the temperature of the preform within the aforementioned ±1° F.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic perspective view showing the processing apparatus of this invention.

FIG. 2 is a transverse sectional view on an enlarged scale through the electrode area of the apparatus, and shows a typical electrode arrangement in conjunction with a typical preform to be heated.

FIG. 3 is a sectional view similar to FIG. 2, and shows a modification of the electrode configuration for varying the temperature of the preform along its length.

In one method of forming thermoplastic articles, particularly containers of the bottle type, preforms are injection molded in one machine and then are transferred to another machine for blow molding. While these preforms may be directly transferred from one machine to the other, the customary procedure is to store the preforms between the machines with the result that the preforms are at ambient temperature of the location at the time they are introduced into the blow molding apparatus. At the present, PET preforms pass through radiant heating ovens with the preform being heated to an optimum orientation temperature prior to the blow molding step so as to facilitate the manufacture of biaxially oriented PET containers. Inasmuch as the preforms are heated from the outside inwardly, there is a tendency for the exterior of the preform wall thickness to have a higher temperature than the interior thereof, and frequently crystallization occurs thereby ruining the preform. Further, the entire preform, including the neck finish which is not to be blow molded, is heated to the preselected temperature. Thus, no temperature gradiation may be obtained along the length of the preform which may be beneficially utilized particularly if the preform is to be prestretched in the blow mold prior to the application of the blowing gases. By providing a variation in temperature in the preform throughout its length, desired thinning may be obtained in selected portions of the preform during the stretching operation while other portions of the preform, particularly that portion which forms the bottom of the preform, may be materially less thinned so as to provide for the desired optimum wall thickness in the various portions of the blown container.

Radiant heating ovens also have other deficiencies. These include the undesirable great length of the oven required for a slow uniform heating of the preforms and the fact that under uniform conditions the temperature of the preforms will decrease with oven usage. This latter condition is due to the use of mirrors which become progressively dirty and thus less effective.

In accordance with this invention, it has been found that the application of radio frequency energy to heat PET preforms will not only provide for the desired heating, but also overcomes many of the deficiencies of radiant heating ovens now in use.

First of all, more uniform heating throughout the thickness of the preform is achieved in that the heat energy is generated within the material as a result of high frequency molecular oscillation.

Next, a shorter heating time can be obtained without material degradation. The heating of a preform by radiant heating in an oven requires 2.0–3.0 minutes in that the oven temperature must be maintained at a predetermined maximum, otherwise there will be overheating of the exterior part of the wall thickness with the result that there will be crystallization and a worthless container will be formed.

In accordance with this invention, a 68 gram preform which previously required a heating time of 2.0-3.0 minutes may be heated in 5-25 seconds to the optimum orientation temperature prior to the blowing step.

There is also more efficient energy transfer. The operating efficiency of a radio frequency unit is on the order of 70-80% as opposed to the relatively low operating efficiency of about 17-20% of existing radiant heating ovens.

It has been found that temperature profiling and selective heating along the length of the preform for more efficient material distribution in the container is possible with a radio frequency heater as opposed to the uniform heating of a radiant heating oven, due both to the shorter heating time involved and the ability to control the electrical energy directed into various portions of the preform along its length. By the proper shaping of the electrodes in a radio frequency heater, a temperature gradient up to 100° F. per inch along the length of the preform can be achieved.

With the radio frequency heating apparatus, it is possible to control the temperature of the preform within $\pm 1°$ F. by utilizing a radio frequency generator having a readily available power output, monitoring the temperature of the preform, and utilizing the results of such monitoring to control the power output of the radio frequency generator.

With respect to the foregoing, it has been found that ambient temperature fluctuation is no longer a concern. The automatic temperature control system is capable of controlling the temperature of the preform coming out of the radio frequency heating apparatus to within the aforementioned $\pm 1°$ F., notwithstanding the fact that the incoming preforms from day to day may have greater variations in temperature.

Referring now to the drawings, it will be seen that the apparatus may include simply an endless conveyor 5 of the chain type which moves in a straight line path 6 at preselected spacing collets 7. The collets 7, as will be described hereinafter, are particularly configured to receive the neck finish portions of preforms and to support the preforms in depending relation along the straight line run 6.

The apparatus also includes a pair of elongated electrodes 8 and 9 which are disposed on opposite sides of the path of preforms depending from the collets 7 as they pass along the run 6. A radio frequency generator 10 is suitably coupled to the electrodes 8 and 9, with the electrode 9 being grounded. It is to be understood that the electrodes 8 and 9 are of a height in accordance with the length of the preforms and are of a length in accordance with the desired heating time and the speed of movement of the conveyor 5.

Although no housing structure has been illustrated it is to be understood that the electrodes 8, 9 and those portions of the conveyor chain 5 will be disposed within a suitable housing. If desired, that portion of the housing along the run 6 may be insulated so as to aid in retaining the heat imparted to the preforms. Also, there necessary, suitable shielding will be provided.

The preforms to be heated are loaded into the collets 7 in advance of the electrodes 8, 9, as at 11, and the heated preforms are preferably removed from the apparatus as at 12, substantially as soon as the preforms exit from between the electrodes 8, 9.

It is to be understood that the preforms will be immediately directed into the loading station of a conventional blow molding machine (not shown) so that the forming of the preforms within a blow mold may be quickly effected before there is an undue heating loss from the preform, and in the case of a controlled temperature gradiation within the preform before there can be a conduction flow of heat between adjacent portions of the preform.

Referring now to FIG. 2, it will be seen that the electrodes 8, 9 in their simplest form are a pair of plates which are disposed in spaced parallel relation with the spacing being sufficient to permit a preform P to pass therebetween with clearance. It is to be understood that the spacing between the electrodes 8, 9 is a controlling factor in the flow of radio frequency electrical energy therebetween and the setting up of the radio frequency electrical energy fields.

The preform P is provided with a neck finish 14 which is engaged in any suitable manner by a respective collet 7 so that the preform is suspended below the collet in an upstanding position as is clearly shown in FIG. 2, although the preforms could be carried in inverted positions. The interconnection between the collet 7 and the neck finish 14 is one which will facilitate the ready unloading of the preforms from the heating apparatus.

At this time it is pointed out that merely for purposes of illustration the collets 7 are shown as being carried by a pair of endless chains 15 which are disposed on opposite sides of the collets and which carry socket members 16 in which the collets 7 are seated for rotation. As is shown in FIG. 1, the chains 15 pass over suitable sprockets 17 to define the path of movement of the collets. The collets in turn have a driving ring 18 which is engaged with a driving member 19. Various means may be provided for effecting the rotation of the collets 7, and in the simplest embodiment the driving ring 18 is merely in frictional engagement with the driving member 18 which is fixed. Positive driving means may be provided if deemed necessary.

Although the chains 15 have been illustrated as moving in a rectangular outline path, the path could be of other outlines including circular. Also, the path could be oriented so as to be other than upstanding in a vertical plane.

The path of movement of the collets 15 could also include movement of the collets through the blow molding machine with the collets supporting the preform in the blow molds and being operable to move the blown articles to an eject station.

It is to be further understood that the collets 7 need not be fixed to the chain 16 for movement therewith about its entire loop, but may be cycled separately from the chain so that the collets 7 may serve to support the preforms as they pass through the blow molding apparatus. In such event, the collets 7 would be in the form of neck rings which would cooperate with the blow molds (not shown) in the customary manner.

It is preferred that the collets 7 be suitably grounded so as to influence the formation of the radio frequency energy field.

It is to be noted that the electrode 8, which is the energized electrode, is of the same general vertical extent as the grounded electrode 9. However, the electrodes 8 and 9 are vertically offset. The offsetting of the electrodes provides two controls on the resultant fields. It has been found that the path of radio frequency energy from the electrode 8 through the closed bottom portion 20 of the preform P provides for a more direct path of energy flow than does the intermediate portion of the preform. Thus, should the lower portions of the electrodes 8 and 9 be coextensive, an undue heating of the closed bottom portion 20 would result. By upwardly offsetting the lower end of the electrode 9, there is no direct energy path between the electrodes 8 and 9 through the closed bottom portion 20.

In order that the electrodes 8 and 9 may be of the same general area, the vertical offsetting of the electrode 9 at the bottom results in a like vertical offsetting of the electrode 9 at the top of the path of the preforms with the upper edge of the electrode 9 being above the upper edge of the electrode 8. This provides a deformed field at the upper part of the path of the preforms which would normally result in an uneven heating of the upper portion of the preform body. However, the upper portion of the field is influenced by grounding the metallic collet 7 so that there is an energy flow between the electrode 8 and the collet 7 which compensates for the offsetting of the electrode 9 above the electrode 8. When the collets are grounded, the area of the electrode 9 may be less than that of the electrode 8.

Reference is now made to FIG. 3 wherein, for purposes of illustration only, the electrode 9' is illustrated as having end portions 9" outwardly offset from the central portion thereof. It has been found that if the spacing between the electrodes is increased in particular areas, the energy flow between the areas of greater spacing is less than that between the areas of lesser spacing. Thus with an electrode configurated in the manner of the electrode 9', the central part of the body of the preform will be heated to a higher temperature than the upper part of the body and the closed lower end 20.

It is to be understood that the configuration of the electrodes may vary greatly, and while only the electrode 9' is illustrated as deviating from planar configuration, it is to be understood that the electrode 8 could be modified in a like manner to provide for a greater heating differential.

It is also pointed out here that the change in spacing between the two electrodes may be much more abrupt or less pronounced than that shown in FIG. 3, depending upon the desired temperature gradient. As stated above, it has been found that with proper electrode shape control a temperature gradient of up to 100° F. per inch along the length of the preform P can be obtained.

The preform P illustrated in FIG. 2 and being the subject of tests with respect to the apparatus has a weight on the order of 68 grams. The length of the electrodes 8, 9 is such that with a heating time of 5–25 seconds one can obtain a ΔT of 100°–220° F. in preforms with a wall thickness varying between 0.100 inch and 0.250 inch.

It has been found that to heat ten preforms per minute with a preform weight of 60–70 grams requires a 2–2.5 kw radio frequency generator. The generator may have a frequency ranging from 1–3000 megahertz. The heat generation is proportional to the frequency and the RF voltage across the work electrodes. At higher frequencies, however, the RF leakage to other machine controls and the possibility of health hazard to operators necessitates complete shielding. Accordingly, it has been found that a frequency range of from 13–98 megahertz provides for an adequate heating rate and requires only simple shielding. Most particularly, 65 megahertz has proven to be quite successful with RF voltages on the order of 15,000–25,000 volts across the work electrodes.

The temperature of the preform as heated with the electrodes 8, 9 of FIG. 2 varies slightly with the highest temperature being adjacent the neck finish and the lowest temperature being at the bottom end of the preform. Typical test runs with preforms weighing on the order of 68 grams are as follows:

TABLE I

| Run # | 1 | 2 | 3 | 4 | 5 | 6** |
|---|---|---|---|---|---|---|
| Heating Time, Seconds | 26.5 | 26.7 | 27.0 | 27.0 | 27.5 | 29.0 |
| Plate Current, Milliamps | 400–460 | 400–460 | 400–465 | 400–470 | 400–485 | 400–500 |
| *Preform Temp: | | | | | | |
| at .6" °F. | 214 | 216 | 225 | 224 | 244 | 256 |
| at 1.5" °F. | 215 | 217 | 225 | 226 | 245 | 248 |
| at 2.5" °F. | 211 | 212 | 218 | 218 | 226 | 237 |
| at 3.5" °F. | 208 | 210 | 216 | 217 | 224 | 234 |
| at 4.5" °F. | 202 | 204 | 210 | 209 | 220 | 227 |
| at 5.4" °F. | 185 | 184 | 189 | 190 | 195 | 205 |

*Distance below the neck ring
**Crystallization at the neck

In addition to the foregoing equipment, the apparatus includes a temperature sensing device 21 which is set to sense the temperature of a heated preform P and which sensing device is coupled to a suitable control device 22 which, in turn, controls the output power of the RF generator 10. By maintaining a continuous control over the preforms being heated, it is possible to maintain a temperature of a selected portion of the preform within ±1° F.

The temperature sensing device 21 and the control device are purchased items. The temperature sensing device 21 is a Williamson Infrared Detector, Model No. 3200 made by Williamson Corporation, Concord, Mass. The control device is a Sentinel I automatic control made by Ultramic Industries, Inc. of 44 Broadway at 4th, Albany New York.

In addition to the benefits of the rapid heating, the fine temperature control, the possible temperature gradient and the power saving, there are other beneficial factors involved which are not readily apparent. First of all, the space required for a radiant heating oven is very large as compared to only several feet for a radio frequency heater. Secondly, and perhaps even more important, is that every time there is a jam in the molding machine for forming the preform into a container or the like, substantially all of the preforms within the radiant heat oven are overheated and therefore must be discarded. On the other hand, with the radio frequency heater a lesser number of preforms are normally in danger of being overheated. This number is on the order of less than 15% of the number of preforms which are lost in a machine shutdown using a radiant heat oven.

Although the invention has been particularly desired with respect to a two-step operation as described hereinabove, it is to be understood that RF heating in accordance with this invention may be equally as well utilized in connection with machines wherein the preforms are retained within one machine and are conditioned between the preform injection molding step and the blow molding step.

Although reference is made solely to the RF heating of polyethylene terephthalate, it is to be understood that like heating may be effected with respect to copolymers and blends thereof.

We claim:

1. A method of rapidly heating a tubular preform formed of polyethylene terephthalate substantially uniformly for the full thickness of the wall thereof, said preform being of the type including a neck finish and a body portion terminating in a closed end and said method comprising the steps of supporting a preform formed of polyethylene terephthalate by its neck finish and while rotating the preform about its axis generating between a pair of electrodes a radio frequency field within the range of 13 to 98 megahertz and subjecting the body portion and closed end to said radio frequency field for a period of time of 29 seconds or less to increase the temperature of the preform body and closed end to a thermoforming temperature.

2. The method of claim 1 wherein the voltage of the field is on the order of 15,000 to 25,000 volts.

3. The method of claim 1 wherein the frequency of said field is on the order of 65 megahertz.

4. The method of claim 1 wherein said radio frequency field is developed between an energized plate and a ground plate having a preform path therebetween.

5. The method of claim 4 wherein the preform is carried by a grounded metallic carrier.

6. The method of claim 4 wherein the preform is carried by a grounded metallic carrier, and the carrier is mounted for rotation about the axis of the preform.

7. The method of claim 4 wherein the intensity of said radio frequency field is modified in an area conforming to the path of the closed end of the preform to prevent overheating of the closed end.

8. The method of claim 4 wherein the intensity of said radio frequency field is modified along said path in a direction normal to preform movement along said path to vary the temperature of a heated preform in axially adjacent portions thereof.

9. The method of claim 8 wherein the variation in temperature is selectively on the order of 0° to 100° F. per linear inch.

10. The method of claim 1 wherein the intensity of said radio frequency field is selectively varied by selectively varying the intensity of electrical energy supplied to form said field.

11. The method of claim 10 wherein the temperature of heated preforms passing from said field is monitored and a resultant signal is used to control the intensity of the electrical energy supplied to form said field.

12. The method of claim 11 wherein the temperature of selected portions of the preform is controlled as closely as to within ±1° F. of a preselected temperature.

* * * * *